(12) United States Patent
Johnson

(10) Patent No.: US 11,600,062 B1
(45) Date of Patent: Mar. 7, 2023

(54) CAMERA SYSTEM FOR DEFINING AN INSPECTION SPACE

(71) Applicant: Raymond C. Johnson, Creve Coeur, MO (US)

(72) Inventor: Raymond C. Johnson, Creve Coeur, MO (US)

(*) Notice: Subject to any disclaimer, the term of this patent is extended or adjusted under 35 U.S.C. 154(b) by 125 days.

(21) Appl. No.: 17/014,537

(22) Filed: Sep. 8, 2020

Related U.S. Application Data

(60) Provisional application No. 62/896,925, filed on Sep. 6, 2019.

(51) Int. Cl.
| | |
|---|---|
| *G06V 20/20* | (2022.01) |
| *G08B 21/24* | (2006.01) |
| *G09B 19/00* | (2006.01) |
| *G06V 10/22* | (2022.01) |
| *G06V 20/52* | (2022.01) |
| *G06V 40/20* | (2022.01) |

(52) U.S. Cl.
CPC ............. *G06V 20/20* (2022.01); *G06V 10/22* (2022.01); *G06V 20/52* (2022.01); *G06V 40/28* (2022.01); *G08B 21/245* (2013.01); *G09B 19/003* (2013.01); *G09B 19/0076* (2013.01)

(58) Field of Classification Search
CPC ...... G09B 19/00; G09B 19/003; G06V 20/20; G06V 20/52; G06V 40/28; G06V 10/22; G08B 23/24
See application file for complete search history.

(56) References Cited

U.S. PATENT DOCUMENTS

| | | | |
|---|---|---|---|
| 11,288,945 B2* | 3/2022 | Kolavennu | G08B 21/0438 |
| 2014/0169622 A1* | 6/2014 | Dryer | G06V 20/52 |
| | | | 382/103 |
| 2020/0321104 A1* | 10/2020 | Lindström | G16H 40/67 |

* cited by examiner

*Primary Examiner* — Timothy A Musselman
(74) *Attorney, Agent, or Firm* — Grace J. Fishel

(57) ABSTRACT

A camera system for defining an inspection space including one or more cameras placed in proximity to a sink or wash station. The camera system is configured such that points within the defined inspection space are visible and may be recorded, but objects outside the defined inspection space are blurred or invisible. This is accomplished by selecting depth of field or by attaching a computing device that is programmed to not record or save information from parts of the image.

17 Claims, 3 Drawing Sheets

CAMERA SYSTEM FOR DEFINING AN INSPECTION SPACE

BACKGROUND OF THE INVENTION

Field of the Invention

The present invention relates to a camera system for viewing/recording images within a permitted inspection space around a sink or wash station.

Brief Description of the Prior Art

The importance of handwashing to personal and public health is well known and well documented. It is known that poor hand cleaning compliance in the healthcare and food industries is a source of infectious disease. It is also known that hand cleaning compliance increases if an employee knows that management is monitoring compliance. The honor system is simply not enough.

Unwashed or poorly washed hands of food service workers leads to millions of cases of food-borne illness in the U.S. each year according to Restaurant News, including outbreaks and even deaths due to salmonella and *E. Coli* food poisoning. Hand washing is recognized as one of the simplest, most effective ways of reducing the rate of food-borne illnesses.

The breakdown of basic hygiene, and the lack of proper hand washing, has also been linked to outbreaks of bacterial and viral illnesses in hospitals, nursing homes, and childcare facilities. It is essential in all such establishments that employees wash their hands properly and/or apply a disinfectant to prevent the spread of disease.

Despite decades of focus on patient safety, the incidence of healthcare-acquired infections (HAIs) is increasing. HAIs affect 5-10 percent of hospitalized patients in the U.S. per year, according to the Center for Disease Control and Prevention (CDC). About 1.7 million HAIs occur in U.S. hospitals each year, resulting in 99,000 deaths. Furthermore, the costs associated with caring for patients afflicted by illnesses caused by HAIs run in the tens of billions of dollars, not to mention medical liability claims, reimbursement penalties, etc. None-the-less, CDC estimates that compliance rates with hand hygiene standards average below 50% among healthcare workers. This poses a serious and largely avoidable threat to patient safety. Handwashing is the single most important means of preventing the spread of infection, according to CDC.

It is also in the public interest that employees in the healthcare and food industries wash their hands according to established protocols. The movements necessary to apply soap and wash one's hands or to apply a disinfectant and spread it on one's hands are well known but ensuring that each employee practices them consistently continues to be a management problem, especially in lavatory environments in which employees are not subject to observation.

Many inventions have attempted to provide a means of monitoring the occurrence of a handwashing event, and some of those have attempted to further determine the quality or adequacy of the handwashing procedure using cameras. However, cameras in lavatories and bathrooms are generally not permitted, as such systems would clearly not be acceptable due to privacy issues beyond the proximity of the sink or wash station.

BRIEF SUMMARY OF THE INVENTION

In view of the above, it is an object of the present invention to provide a camera system with a permissible inspection area in a lavatory, allows handwashing monitoring and other hygiene activities where a camera would otherwise be inappropriate.

More particularly, the present invention describes a means of creating an inspection area in a lavatory within which it would be permissible to implement a handwashing monitoring system capable of monitoring arbitrarily complex user-specific hygiene activity, while avoiding the need for the presence of cameras capable of video recording beyond the permissible areas of the lavatory.

This invention may be used in conjunction with a handwashing monitoring system in which a user approaches a handwashing station and is identified through RFID or through any one of several possible biometric methods (speech recognition, face recognition, etc.). Once the system identifies the user, it retrieves user-specific information including, but not limited to, which specific handwashing protocol the user must complete and instructional information to be provided to the user about the protocol.

Data collected by the system includes the identity of the user, the date, time, duration and location of the washing event, degree of compliance with each step in the protocol as well as compliance with the complete protocol. Data may include any video images of the washing event captured by the system and/or any audio collected from the user. All data is saved to storage media in a computing system for management review and reporting.

BRIEF DESCRIPTION OF THE SEVERAL VIEWS OF THE DRAWINGS

In the accompanying drawings, in which one of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
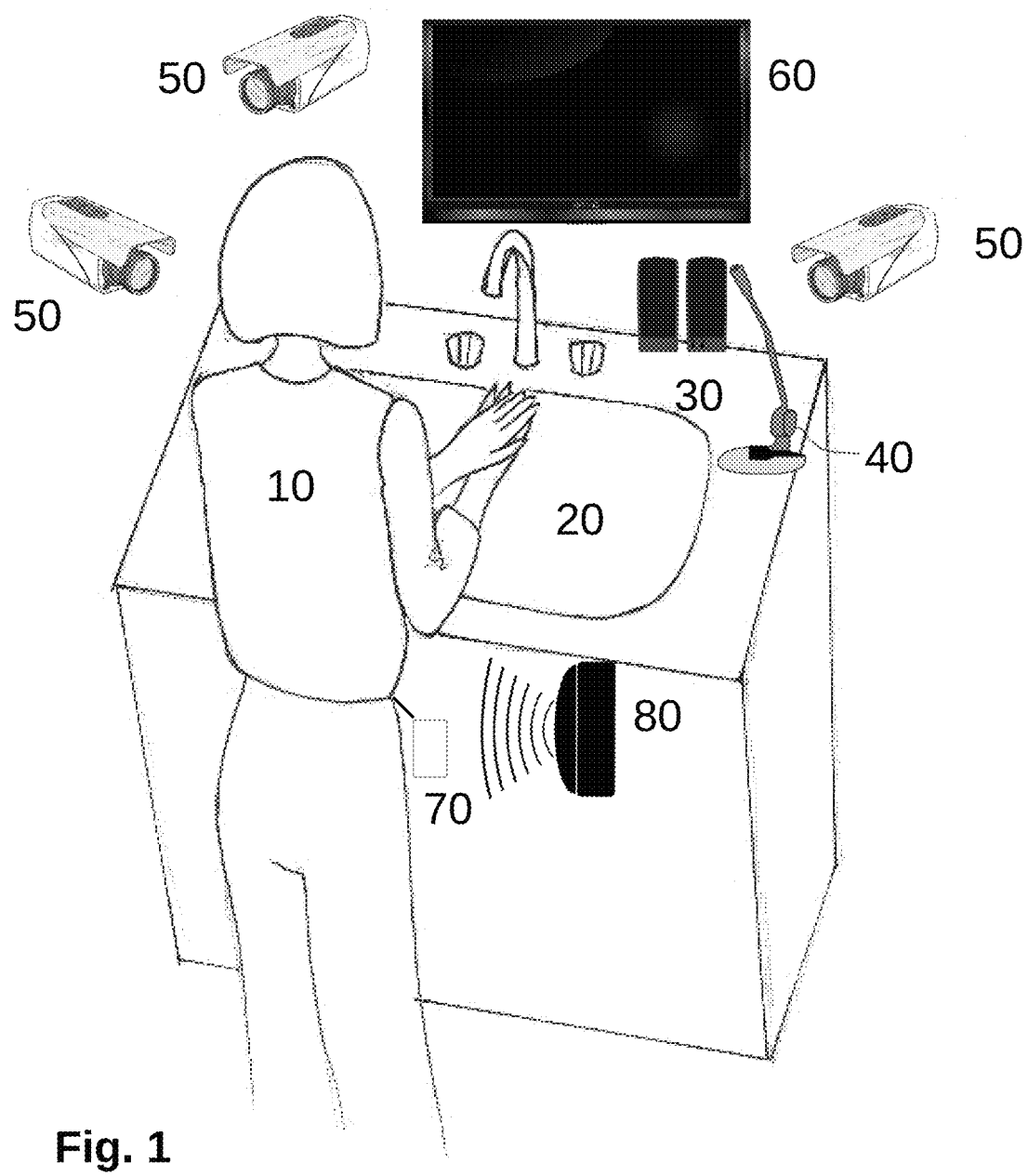
FIG. 1 shows a person using a typical embodiment of the system.

Referring to the drawings more particularly by reference character, FIG. 1 shows a person using a typical embodiment of the system. The user (10) stands at a sink or wash station (20). Upon approach to the wash station the user is identified by either an RFID reader (80) reading the user's RFID badge (70), a camera (50) capturing an image of the user's face and sending it to a computer for face recognition identification, the user speaking into a microphone (40) which captures the user's utterance of a unique phrase which is sent to a computer for speech recognition identification of the user, or the like. Instructional or entertainment content retrieved by the system for the user is then displayed on a video monitor (60) with audio being played through a speaker (30). As the user proceeds to comply with a handwashing protocol, additional cameras (50) are oriented so as to capture images of any motions appropriate to the protocol. Said images are immediately analyzed for compliance until the protocol is either complete or aborted.

This mathematical definition of the inspection space can be accomplished by combining two methods: First, for a camera viewing a normal rectangular area with, for example aspect ratio 3:4 as in most cameras, settings may be defined in the computer software that acquires and processes the digital images from the camera to specifically not record or save information from parts of the image. For example, a camera positioned to point horizontally over the top of the sink may take an image that is mostly a wall, but is partly open space in the restroom. The computer software can be set to discard the portion of the image on one side of the captured image to eliminate viewing of the open portion of the restroom. In one example, a camera that takes image of 480 pixels high and 640 pixels wide may send images which are processed to discard the first 150 column of pixels, resulting in an image that is 480 pixels high and 490 pixels wide that is subsequently process to examine hand washing activity. Second, the images from the camera positioned horizontally over the sink may be used to trigger use of images from a camera positioned horizontally and pointed outward from the mirror over the sink. This second camera would be set to a shallow depth of field as described below and the images from the camera would be discarded unless and until a particular feature of interest (for example, a hand) is detected in the images from the first camera. When such feature is detected, the images from the second camera would be analyzed in conjunction with the images from the first camera to create 3-D representations of the hand washing motions for analysis.

Figure 2:
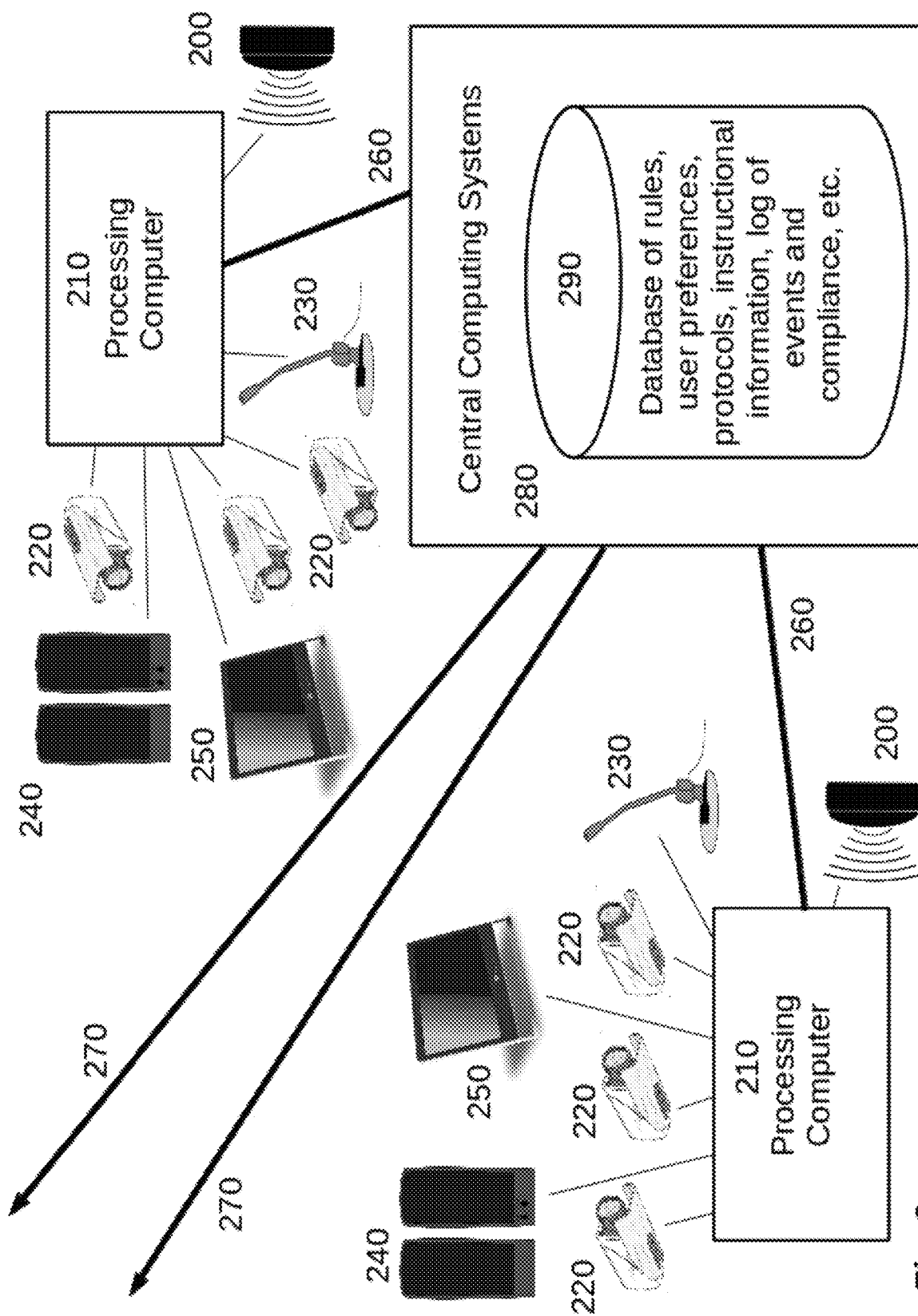
FIG. 2 shows typical computer network architecture of a system monitoring multiple wash stations.

FIG. 2 shows typical computer network architecture of a system monitoring multiple wash stations. It will be understood that in a facility such as a hospital, management may require monitoring of many handwashing stations that have somewhat different protocols, and that data must be collected and analyzed from all monitors by a single computing system. Therefore, a typical embodiment would entail a central computer system or a set of computers (280) that share the work of processing information received from the various monitoring stations (210). Said computers being connected via a network to a computing system at each monitoring station which does the work of processing any data with respect to the handwashing that must be monitored in proximity to the wash station. Connections to two such monitoring station computers (210) are shown (260) and connections to other stations may be present (270). The computer at each wash station is connected to any peripheral hardware being used at the monitoring station—LCD monitor (250), cameras (220), speaker (240), microphone (230), RFID reader (200) and the like. In addition to logging all monitored events, the central computing system (280) is a repository of information about specific protocols that may be required of users, specific user parameters, such as information about the duration of an handwashing event from the time soap is dispensed to the time a paper towel is dispensed, how a specific user performs the motions required by specific steps in a protocol, user selected entertainment content, etc. (290).

Figure 3:
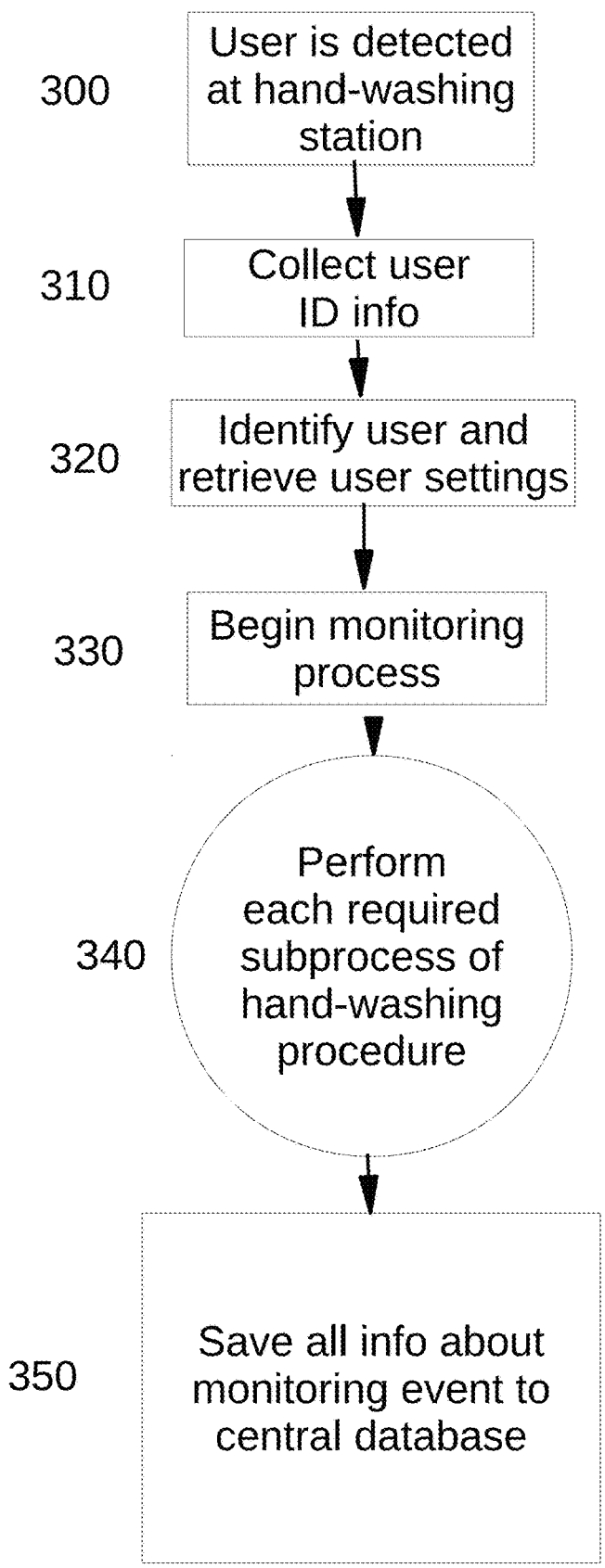
FIG. 3 shows a high-level abstract process flow for a typical embodiment of the system.

FIG. 3 shows a typical process flow for an embodiment of the system. A user is detected at a wash station (300). The system collects the user's ID information (310). The user is identified by the system and user-specific information is retrieved (320). Based on the user-specific information, the wash station location, etc., a protocol is selected and monitoring of compliance with the protocol is initiated (330). Compliance with each step or subprocess in the selected protocol is monitored (340). Finally, all data about the washing event is saved to the central database (350).

In one embodiment of the system, an employee of a food handling facility walks up to the sink in a publicly accessible restroom. The employee identifies themselves to the system by speaking a unique phrase. Through speech recognition technology, the central server identifies the user.

The image of the user's hands and forearms appears on a video monitor mounted inside the mirror over the sink. The video monitor is behind a two-way mirror so that when it is not illuminated the mirror looks like a mirror, but when the monitor is activated, it is visible through the mirror.

One or more cameras are mounted on either side of or above the sink. Multiple cameras may be oriented as part of a system which can be programmed such that the system software eliminates image data recorded by one camera based on the image recorded from another camera. For example, consider just the area immediately in front of a sink in a ladies' lavatory. First, one would define the area such as a space of 4'×5'×8' centered on the sink. The area is 5 feet deep, starting at the mirror and ending 5 feet back from the mirror and eight feet tall, from the floor up. Each point within this box may be identified by x, y, and z coordinates. Someone standing six feet back from the mirror would not be seen. As they inched forward, when their nose passed the rear plane, just the nose would appear. Next, the eyebrows would appear, then the front of the face, then the ears, etc. as they moved further into the visible zone. In this example, as someone moves toward the mirror they enter the view of a camera pointing across the sink and only at that point is the data that represents the person in the image from the camera pointed outward from the mirror used. In effect, the system would only "see" and record the area in which hand-washing would occur, and not the rest of the restroom.

Cameras may alternatively be placed in proximity to the sink such that they are close to the subject, and set to a shallow depth of field by appropriately setting the focal length (f-stop) of the camera and/or setting a large aperture. This will result in images in which objects in the distance would not be in focus, thereby establishing the space relative to the sink within which viewing is permitted, and limiting viewing and recording to only the particular spatial region of interest such that points within the defined space are visible but points outside that space are blurred.

Images from the cameras are sent to a central computer during the handwashing and combined and processed so that the system can determine, for each step of the handwashing process, the degree of compliance of the user, based on a rule set defining how and how well each step is to be performed.

The hand-washing event and all data pertinent to the level of compliance with all steps in the handwashing process are saved to a central computer, including identity of the user, date, time and location of the handwashing events, the level or quality of compliance with the step, and any steps skipped or repeated, and is made available to management in a variety of reporting options.

It will be clear that various changes may be made to the processes, computing systems, specific methods of user identification and interaction, and other methods described in the various example embodiments presented here without departing from the scope of this invention.

What is claimed:

1. A camera system for viewing/recording a permissible inspection space proximate a sink or wash station, said system having a shallow depth of field in the inspection space beyond which objects will not be in focus or said system mathematically defining two- or three dimensional coordinates of the inspection space and only displaying information from the inspection space, said camera system having first and second cameras connected to a computing device wherein images from the first camera positioned horizontally transverse a sink or wash station trigger use of images from the second camera positioned horizontally and pointed outward from a two-way mirror over the sink or wash station, said second camera having a shallow depth of field in the inspection space, said images from the second camera discarded until images from the first camera are identified as a particular feature of interest and are displayed in a lighted video monitor positioned behind the two-way mirror.

2. The system of claim 1 wherein the computing device is programmed to monitor handwashing processes from simple handwashing to full surgical scrub, said system including user identification, single- or multi-camera monitoring of handwashing motions, media for instructional or other feedback to the user, said computer storing handwashing rules, instructional and other media, user-specific characteristics and rules, and data on the status, quality and compliance of all handwashing events monitored.

3. The system of claim 2, wherein the computing device is connected to a user identification subsystem.

4. The system of claim 2, wherein the computing device provides audio and/or video instructions to a user on how to perform each step of said processes.

5. The system of claim 2, wherein the computing device contains an algorithm for analyzing images from said set of handwashing monitoring cameras and making a determination whether a user has satisfactorily performed each step of said processes.

6. The system of claim 5, wherein the computing device informs the user via audio and/or video feedback if any step or series of steps of said processes has not been performed satisfactorily, determining appropriate possible actions for the user to take based on a set of rules about the degree of compliance required for a particular step or series of steps and requesting that the user select from among those possible actions and perform the selected action.

7. The system of claim 1, wherein said computing device contains programs and databases for logging data from each handwashing process event and further comprises management reporting, analysis and alerts based on such data.

8. The system of claim 7, wherein said computing device further logs and stores data from each handwashing process event including location of the handwashing event.

9. The system of claim 7 wherein said computing device further logs and stores data from each handwashing process event including identity of a user performing the handwashing processes.

10. The system of claim 7, wherein said computing device further logs and stores data from each handwashing process event including date and time of the beginning and end of a full handwashing processes performed based on the elapsed time between dispensing of soap and dispensing of a paper towel.

11. The system of claim 7, wherein said computing device further logs and stores data from each handwashing process event including any specific steps in the handwashing process which were not satisfactorily performed by a user, the reason said step was not satisfactorily performed and user's action in response to being informed of non-satisfactory performance of said step.

12. The system of claim 7, wherein said computing device further logs and stores data from each handwashing process event including video images of a user's hands.

13. The system of claim 7, wherein said computing device further logs and stores data from each handwashing process event including a video recording of a handwashing process or any part thereof.

14. The system of claim 7, wherein said computing device further logs and stores data from each handwashing process event including audio recordings of any audio spoken by a user during each handwashing process including audio spoken for user identification, audio commands spoken to the system and/or audio responses spoken by the user in response to system instructions or information.

15. The system of claim 7, wherein said computing device includes programming to allow management of users performing handwashing processes to view any detailed information regarding the handwashing processes contained in the computing device database.

16. The system of claim 7, wherein said computing device further comprises programming of rules established by management defining the degree of compliance necessary for each step or series of steps in the handwashing process, what user actions are appropriate in response to each degree of non-compliance, how the system will instruct the user and/or log the degree of compliance with said rule and what level of instruction the system will provide based on the level of expertise of a user.

17. The system of claim 16, wherein said computing device provides immediate alerts to management when a user has not satisfactorily performed a handwashing process or any part thereof.

* * * * *